United States Patent Office 2,749,356
Patented June 5, 1956

2,749,356

METHOD OF ISOLATING AND PURIFYING KETO STEROIDS AND NEW KETO STEROID COMPOUNDS

Leon Velluz, Paris, France, assignor to Les Laboratoires Francais de Chimiotherapie, Paris, France, a French body corporate No Drawing. Application February 12, 1953,
Serial No. 336,630

10 Claims. (Cl. 260—397.4)

This invention relates to a method of purifying and isolating ketosteroids, and more particularly to an improved method of selectively separating certain valuable ketosteroids of great therapeutical and industrial importance from suitable natural and synthetic crude and starting materials, such as the estrogenic hormone estrone or the adrenocortical hormone cortisone, and certain new compounds obtained thereby.

It is known that steroid hormones are produced either by extraction of natural materials of complex composition such as the urine of pregnant mares which yields estrone, or by rather complicated synthetic methods which, for instance, in the case of cortisone, involve at least 20 steps. When isolating a keto steroid from natural starting material by extraction, said material always yields several substances which are very similar in constitution to the desired keto steroid. For instance, in the case of urine of pregnant mares, there are found, besides the effective compound, estrone, similar by-products, biological precursors, and degradation products thereof. In case a product is involved which is obtained by synthesis, it is not very expedient to purify each intermediate compound to about 100% purity. One depends usually on the specific tendency of certain of the intermediate products to selectively crystallize. Such specific intermediates are then purified in the course of the synthesis, attending more closely to the purification of the final product.

Quite often a keto steroid to be investigated for its use in human or veterinary medicine, is contaminated by substances which possess like solubility characteristics. Therefore, fractional crystallization, very often, does not give satisfactory results. Moreover, repeated crystallization results usually in costly losses which should be avoided.

It is known that a very important advance in the art was made by suggesting to separate keto steroids from accompanying non-keto steroids by reacting the keto compounds with ketone reagents. Two of the best known examples of such separation processes are the isolation of the semicarbazone of trans-dehydroandrosterone, an important intermediate product in the synthesis of testosterone, from neutral cholesterol oxidation products, and the isolation of estrone from the urine of pregnant mares by means of the "reagents T and P" of Girard and Sandulesco. Reagents T and P permit the conversion of ketones into water soluble compounds in the form of hydrazones with quaternary ammonium residues.

The semicarbazones, however, are practically almost insoluble and, therefore, do not permit any fractionation of the keto steroids. The Girard and Sandulesco reagents produce excellent results either on account of the different speed of reaction of various hormones therewith, or on account of the differences in hydrolysis of such reaction products, or on account of the different pH-values required for splitting up the hydrazones T or P into their corresponding keto compounds on regeneration therefrom. But the working conditions with these reagents are so delicate that their application is rather restricted and utilises very important liquid volumes.

As stated above the semicarbazones are, in general, completely insoluble. This is also true with dinitro phenyl hydrazones which are praised as being especially suitable for analytical purposes. These compounds, however, can be hydrolized only with difficulty. The oximes, other classic keto derivatives, are usually too soluble.

The heretofore used ketone reagents have the disadvantage that they do not possess sufficiently selective reactivity with various keto steroids and that, therefore, they do not effect satisfactory separation of the most desired keto steroids.

It is one object of this invention to provide a ketone reagent which allows selective precipitation of only a few important keto steroids but which does not react with keto steroids of less importance.

Another object of this invention is to produce ketone derivatives of important keto steroids which allow complete separation of said keto steroids from other keto steroids of less importance, and which can be readily hydrolized to reform the keto steroid component reacted.

Still another object of this invention is to provide a ketone reagent which forms with certain important keto steroids reaction products, which are insoluble in organic solvents used in the synthesis of said keto steroids or in the extraction of said keto steroids from certain natural starting materials and which, therefore, can be readily separated from other keto steroids and from non-ketonic steroid compounds contained in said solutions.

A further object of this invention is to provide a method of isolating certain important and valuable keto steroids from solutions containing said keto steroids and other steroid compounds and by-products and of purifying crude preparations thereof in a simple, effective, and economical manner.

Further objects of this invention will become apparent from the specification and the examples given therein.

The present invention consists in principle in using as ketone reagent for selectively precipitating reaction products of said ketone reagent with certain valuable ketosteroids from suitable starting materials and solutions, the hydrazide derived from diphenyl glycolic acid, also called benzilic acid. Said hydrazide will be designated herein and in the claims annexed hereto as "reagent B." It corresponds to the following formula

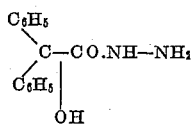

The keto steroids react with said hydrazide according to the following equation

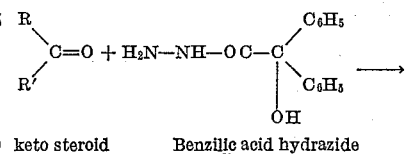

keto steroid    Benzilic acid hydrazide
hormone          Reagent B

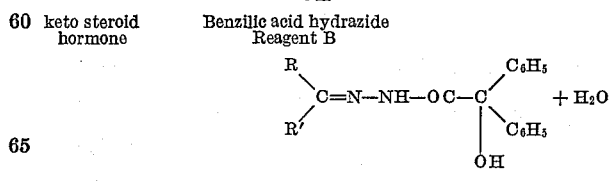

keto steroid hydrazone B

Said hydrazone is only slightly soluble, and, therefore, can readily be collected and separated from the reaction mixture, and is easily split up thereby regenerating the keto steroid component thereof.

Benzilic acid hydrazide is a well known product and is produced according to the method of Curtius "Journal der Praktischen Chemie" 2nd series, volume 95, page 196 (1917).

The hydrazones with keto steroids are produced, for instance, by reacting the keto steroid or a mixture of keto steroids in a suitable indifferent solvent i. e. of neutral reaction with said benzilic acid hydrazide. In some cases it is advisable to add to the mixture a small amount of an organic acid, such as acetic acid, which has a catalytic effect upon the reaction and accelerates the same. It is also possible to react the hydrazide and the keto steroid in pure acetic acid i. e. without any indifferent solvent. Reaction takes place in the cold, after a more or less prolonged contact of the reaction components, or by heating the reaction mixture under reflux.

It was found that said reagent B does not react at all with a number of the more customary keto steroids. With certain others it produces hydrazones of low solubility in the selected solvent. When using mixtures of keto steroids, very often only one single keto steroid is precipitated in the forme of a hydrazone B, while the others remain unreacted or their reaction products are soluble in the solvent. After filtering or centrifuging and subsequent recrystallization, the hydrazone B can be split up and, thereby, the keto steroid which reacted with said reagent B, is regenerated and recovered. Depending upon the specific hydrazone B employed, said regeneration of the keto steroid is effected by hydrolysis with mineral acids or strong organic acids or by double decomposition and exchange with an aldehyde or a ketone which possesses a much greater affinity to said reagent B than the keto steroid involved, whereby said aldehyde or ketone is preferably used in excess of the required amount in order to cause a shift of equilibrium. Benzaldehyde or pyruvic acid, for instance, are especially suitable for such exchange reaction, the latter compound being used advantageously in dilute acetic acid solution.

Reagent B forms, for instance, crystalline and only slightly soluble hydrazones with the following keto steroids:

Estrone, i. e. 3-hydroxy-17-keto-$\Delta^{1,3,5(10)}$-estratriene; cis-testosterone, i. e. 17 α-hydroxy-3-keto-$\Delta^4$-androstene; nor-cholestenolone, i. e. 3 β-hydroxy-25-keto-$\Delta^5$-27-nor-cholestene;

Desoxycorticosterone esters, especially 21-acetoxy-3,20-diketo-$\Delta^4$-pregnene, i. e. the acetate of 21-hydroxy-3,20-diketo-$\Delta^4$-pregnene;

Cortisone esters, especially 17α-hydroxy-21-acetoxy-3,11,20-triketo-$\Delta^4$-pregnene, i. e. the 21-acetate of 17α,21-dihydroxy-3,11,20-triketo-$\Delta^4$-pregnene.

Under analogous reaction conditions no precipitation occurs, for instance, with the following compounds:

Trans-dehydroandrosterone, i. e. 3β-hydroxy-17-keto-$\Delta^5$-androstene;

$\Delta^4$-androstendione-3,17;

Trans-testosterone, i. e. 17β-hydroxy-3-keto-$\Delta^4$-androstene;

Pregnenolone, i. e. 3β-hydroxy-20-keto-$\Delta^5$-pregnene;

Progesterone, i. e. 3,20-diketo-$\Delta^4$-pregnene;

Equiline, i. e. 3-hydroxy-17-keto-$\Delta^{1,3,5(10),7}$-estratetraene, to mention only the better known keto steroids.

It is very surprising that such great differences in solubility exist between various benzilic acid hydrazones of keto steriods, the more so in view of the fact that the hydrazides of quite related acids, namely of mandelic acid and diphenyl acetic acid, do not show such selective solubility. The mandelic acid hydrazones are almost all soluble under the usual reaction conditions when using methanol and ethanol as solvents. The diphenyl acetic acid hydrazones, on the other hand, do not show any differences in solubility; almost all of its hydrazones are insoluble so that no selective precipitation is achieved, as is evident from the following table:

| Ketone | Precipitation of hydrazones | | | |
|---|---|---|---|---|
| | Diphenyl acetic acid hydrazones | | Benzilic acid hydrazones (Reagent B) | |
| | with heating | without heating | with heating | without heating |
| Nor-cholestenolone acetate | + | + | − | − |
| Nor-cholestenedione | + | + | − | − |
| Estrone | − | + | + | + |
| Equiline | − | + | − | − |
| Trans-dehydroandrosterone | + | + | − | − |
| Trans-dehydroandrosterone acetate | + | + | − | − |
| Androstenedione | + | + | − | − |
| Androstanolone | + | + | − | − |
| Androstanolone benzoate | + | + | + | + |
| Cis-testosterone | + | + | + | + |
| Trans-testosterone | + | + | − | − |
| Trans-testosterone acetate | + | + | − | − |
| Trans-testosterone propionate | + | + | − | − |
| Methyl testosterone | + | + | − | − |

Consequently, benzilic acid hydrazide permits the separation of valuable keto steroids from mixtures with a great number of other keto steroids of no or only limited value, and the purification of valuable keto steroids which are contaminated by structurally similar keto steroids having the tendency to crystallize together with said valuable keto steroids.

An important field of application of said benzilic acid hydrazide is the field of recovering pure estrone and of separating said estrone from residues obtained in the course of its manufacture and containing large amounts of equilenine and equiline. The solubility of the hydrazone B of estrone of the following formula

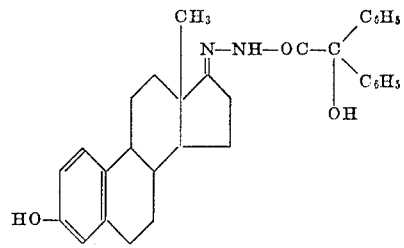

in methanol is about 5 times lower than that of the hydrazone B of equilenine of the following formula

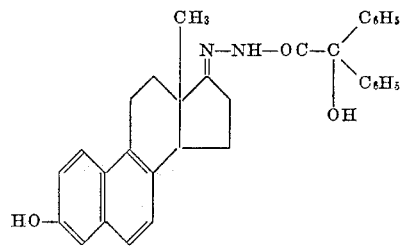

and about 50 times lower than that of the hydrazone B of equiline of the following formula

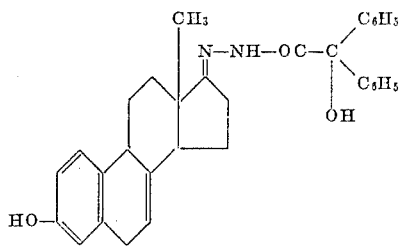

The process of this invention is, of course, also applicable to the manufacture of estrone from the urine of pregnant mares by methods know per se. In these manufacturing processes one proceeds usually as follows: The urine is hydrolized and is extracted with a solvent for lipides. The resulting extract is then saponified and the crude unsaponifiable fraction thereof is treated with one of the keto reagents T or P of Girard. The reaction product with the ketonic constituents of said unsaponifiable fraction is treated with sodium hydroxide solution to separate therefrom the keto phenols and yields a crystalline mixture of estrone, equiline, and equilenine. Said mixture is once or twice recrystallized whereby the greater part of estrone is recovered in pure form. A considerable portion of said estrone, however, remains in the mother liquors and forms a, so to say, inseparable mixture with its two by-products, equiline and equilenine. The greater part of the equilenine can be separated from said mixture by converting it into its picrate according to the method developed by G. Sandulesco, Wang, A. Girard "Comptes Rendues de l'Academie des Sciences" vol. 136, page 137 (1933). This process, however, does not separate from said mixture the estrone, i. e. its most valuable constituent. According to the present invention it is possible to selectively precipitate from the residual mixture estrone in the form of its hydrazone B. The accompanying compounds, i. e. mainly equiline, form also hydrazones B; but these hydrazones are not at all or only to a slight extent precipitated under the reaction conditions. Estrone, in pure form, can then be regenerated from the precipitated hydrazone B by hydrolysis whereby the yield is practically quantitative.

The method of reacting a keto steroid with reagent B may be employed with great advantage in another important manufacturing process, namely in the preparation of cortisone. One step of the synthesis of this compound consists in oxidizing 11,20-diketo-3α,17α-dihydroxy-21-acetoxy pregnane to 3,11,20-triketo-17α-hydroxy-21-acetoxy pregnane. It was found that the small amounts of unoxidized starting material considerably disturb and impede the following reaction steps. It was found that purification by recrystallization does not yield satisfactory results and does not remove said impurity. This problem, however, is readily solved by employing the hydrazide of benzilic acid as reagent. With said reagent unoxidized 11,20-diketo-3α,17α-dihydroxy - 21 - acetoxy pregnane forms a hydrozone B which is readily soluble, for instance, in methanol while the hydrazone B of its triketo oxidation product is remarkably insoluble therein.

Apparently a single double bond in the steroid structure of compounds of the cortisone series as well as of compounds of the estrone series, is capable of considerably modifying the solubility of the hydrazones B of said compounds. It has been shown above that the hydrazone B of equiline is about 50 times more soluble in methanol than the hydrazone B of estrone.

Likewise the hydrazone B of cortisone acetate of the following formula

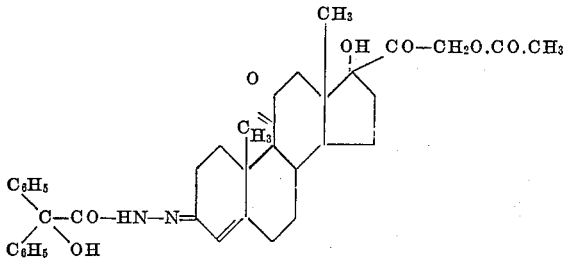

is soluble in dichloro ethane while the hydrazone B of the 4,5-saturated cortisone acetate of the following formula

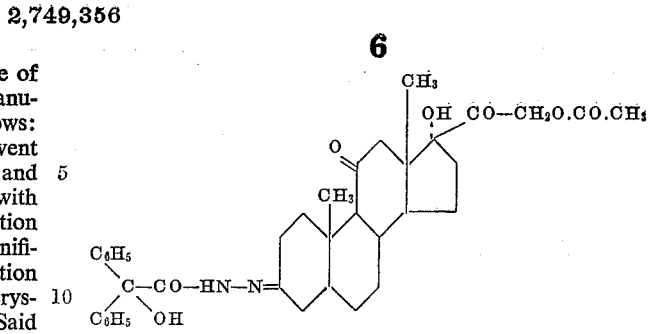

is not at all soluble therein.

One may proceed, without in any way departing from the principles of this invention, in such a manner that first the mixture of keto steroids is reacted with reagent B in a solvent wherein all the hydrazones B are soluble, whereafter one of the hydrazones B is precipitated by adding another solvent to the solution wherein said particular hydrazone B to be separated is insoluble. One may, of course, also evaporate to dryness the solution of the hydrazones B in a solvent wherein all of them are soluble, and may extract from the evaporation residue by means of another suitable solvent the one or the other of said hydrazones B. In cases in which the desired product contains only one impurity, one may react said impurity with reagent B to eliminate the same. In this manner it is, for instance, possible to separate the hydrazone B of cis-testosterone which is insoluble in methanol, from the hydrazone B of the male sex hormone trans-testosterone which remains dissolved in methanol.

The following examples serve to illustrate this invention and some of the advantageous features thereof will appear from the description of preferred modes of carrying out the invention. It is to be understood, of course, that the invention is not to be limited to the precise order of steps of the processes set forth, as the invention can be embodied in a plurality and a variety of forms and can be practiced in a plurality and a variety of ways.

Thus one may use other indifferent solvents such as isopropanol, dioxane, benzene, as well as other organic acids, alone or mixed, such as formic or tartaric acid.

The melting points given in the following examples were determined in the Maquenne block and indicate the point of instantaneous melting.

EXAMPLE 1

*Hydrazone B of estrone and regeneration of estrone therefrom*

50 g. of estrone and 50 g. of benzilic acid hydrazide (reagent B) are heated under reflux in 5,000 cc. of methanol and 200 cc. of glacial acetic acid. The reaction mixture is cooled whereby the benzilic acid hydrazone of estrone crystallizes. The crystals are filtered off and washed with methanol. 86 g. of hydrazone B are obtained. Melting point: 170° C. Specific rotatory power: $[\alpha]_D: +75°$ (in 1% dioxane solution). Yield: 95%.

Said hydrazone B may be hydrolized in the following manner:

100 g. of the hydrazone are suspended in 800 cc. of ethanol (96%) and 800 cc. of acetone. The mixture is heated to boiling, 160 cc. of pure hydrochloric acid ($d=1,19$) are rapidly introduced into the boiling reaction mixture which is then cooled by means of ice water. 16 liters of N hydrochloric acid are added. The mixture is allowed to stand for a certain period of time and is filtered off. The precipitate is washed with N hydrochloric acid and with distilled water. After drying, 53 g. of regenerated estrone are obtained having a melting point of 262° and a specific rotatory power of $[\alpha]_D: +163°$ (in 1% dioxane solution). Yield: Quantitative.

EXAMPLE 2

*Separation of estrone and equiline*

100 g. of a mixture of ketones containing estrone, are dissolved, while heating, in 2 liters of methanol and 80 cc. of glacial acetic acid. 125 g. of reagent B are added and the mixture is boiled under reflux for two hours. If the starting material is rich in estrone, hydrazone B of estrone starts to precipitate during boiling. If the starting material is poor in estrone, crystallization must be initiated by scratching and inoculating. Estrone hydrazone B is filtered off and washed with methanol.

Said hydrazone B is taken up in 2 liters of boiling methanol (98–99%). Thereby no recrystallization takes place but dissolution of any equiline hydrazone B which might be included in said estrone hydrazone B. The mixture is allowed to stand until the next day, the crystals are filtered off and washed several times with methanol. The dried estrone hydrazone B melts at 169–170° C. and has a specific rotatory power of $[\alpha]_D: +75°$ (in 1% dioxane solution).

Hydrolysis of said hydrazone B is effected in the same manner as described in Example 1 and yields, quantitatively, estrone having a melting point of 262° C. and a specific rotatory power of $[\alpha]_D: +163°$ (in 1% dioxane solution).

EXAMPLE 3

*Hydrazone B of cis-testosterone*

29 g. of cis-testosterone are boiled under reflux for one hour in 600 cc. of methanol containing 6 cc. of glacial acetic acid and 27 g. of reagent B which was previously dissolved by heating in 250 cc. of methanol. The total volume is 850 cc. The reaction mixture is allowed to stand overnight at room temperature. The precipitate is filtered off, washed with methanol and dried. 46 g. of hydrazone B of cis-testosterone melting at 185° C., are obtained.

Said hydrazone is hydrolized by dissolving 50 g. thereof in 200 cc. of glacial acetic acid containing 20 cc. of pyruvic acid and 10 cc. of water. The reaction can be effected by room temperature. After a certain period of time crystals separate which are filtered off and washed with a solution of sodium bicarbonate (5%) and then with water. After drying 26 g. of cis-testosterone are obtained.

EXAMPLE 4

*Separation of cis-testosterone from trans-testosterone*

58 g. of a mixture of trans- and cis-testosterone as it is obtained on recrystallizing of testosterone, is reacted in the same manner as described in Example 3, with reagent B. 20 g. of hydrazone B of cis-testosterone are obtained. The mother liquors are evaporated to dryness and are hydrolized as described in Example 3 whereby 44 g. of a crude product are obtained. On recrystallization, 30.8 g. of pure trans-testosterone are obtained therefrom.

EXAMPLE 5

*Hydrazone B of cortisone acetate and regeneration of cortisone acetate therefrom*

50 g. of cortisone acetate (3,11,20-triketo-17α-hydroxy-21-acetoxy-Δ⁴-pregnene) and 33 g. of reagent B are boiled under reflux in 1 liter of methanol containing 10 cc. of acetic acid. After cooling the reaction mixture, the precipitated crystals are filtered off, washed, and dried. The yield is 96%. The benzilic acid hydrazone of cortisone acetate crystallizes in platelets which are insoluble in ether and only slightly soluble in chloroform and acetic acid. Melting point: 196° C.; specific rotatory power: $[\alpha]_D: +235°$ to 240° (in 1% chloroform solution).

Said hydrazone B is hydrolized in the following manner:

50 g. of said hydrazone B are treated with a mixture of 200 cc. glacial acetic acid, 20 cc. of pyruvic acid, and 10 cc. of water. The crystals obtained thereby are filtered off and washed with a solution of 5% sodium bicarbonate and then with water. The washed product is dried. 30 g. of cortisone acetate are obtained. Melting point: 247° C.; specific rotatory power $[\alpha]_D: +177°$ (in 1% acetone solution). Yield: 95%.

EXAMPLE 6

*Purification of cortisone acetate*

40 g. of impure cortisone acetate, melting at 230° C., are treated with 30 g. of reagent B in 1,000 cc. of methanol containing 1% of acetic acid. On cooling, hydrazone B of cortisone acetate melting at 196° C. and having a specific rotatory power of $[\alpha]_D: +235-240°$ (in 1% chloroform solution), is obtained.

Said hydrazone B is hydrolized in the same manner as described in Example 5, thereby yielding cortisone acetate melting at 247° C. and having a specific rotatory power $[\alpha]_D: +177°$ (in 1% acetone solution).

EXAMPLE 7

*Hydrazone B of 3,11,20-triketo-17α-hydroxy-21-acetoxy pregnane*

120 g. of reagent B and 100 g. of 3,11,20-triketo-17α-hydroxy-21-acetoxy pregnane are heated under reflux in 200 cc. of dichloro ethane. The reaction mixture is cooled, the precipitated crystals are filtered off, washed, and dried. 150 g. of the benzilic acid hydrazone of 3,11,20-triketo-17α-hydroxy-21-acetoxy pregnane are obtained corresponding to a yield of 95%. Said hydrazone B forms needles which melt at 210° C. and have a specific rotatory power of $[\alpha]_D: +101°$ (in 1% pyridine solution). Yield: 95%. The hydrazone B is only slightly soluble in the ordinary solvents but is soluble in pyridine.

Said hydrazone B is decomposed in the following manner: 50 g. thereof are treated with a mixture of 200 cc. of glacial acetic acid, 20 cc. of pyruvic acid, and 10 cc. of water. The crystals formed thereby are washed with a solution of sodium bicarbonate (5%), subsequently with N hydrochloric acid, and finally with water. After drying, 30 g., corresponding to 95%, of 3,11,20-triketo-17α-hydroxy-21-acetoxy pregnane having a melting point of 231° C. and a specific rotatory power of $[\alpha]_D: +82°$ (in 1% acetone solution), are obtained thereby.

EXAMPLE 8

*Purification of 3,11,20 - triketo - 17α - hydroxy-21-acetoxy pregnane*

16 g. of 3,11,20-triketo-17α-hydroxy-21-acetoxy pregnane containing, as impurity, 20% of 11,20-diketo-3α,17α-dihydroxy-21-acetoxy pregnane are boiled under reflux in 350 cc. of methanol containing 1% of acetic acid, with 19 g. of reagent B. On cooling, 23 g. of crystals melting at 210° C. are obtained which represent the hydrazone B of the triketo compound. Hence, the yield is 95%.

Said hydrazone B is decomposed as described in Example 5 whereby pure 3,11,20-triketo-17α-hydroxy-21-acetoxy pregnane melting at 231° C. and having a specific rotatory power $[\alpha]_D: +82°$ (in 1% acetone solution) is obtained.

EXAMPLE 9

*Separation of cortisone acetate from 3,11,20-triketo-17α,21-dihydroxy pregnane*

43 g. of a residue obtained on evaporation of the mother liquors from cortisone which residue contains 3,11,20-triketo-17α,21-dihydroxy pregnane are acylated by means of acetic acid anhydride and pyridine. The reaction product which forms a yellowish gum, is dissolved, while heating to boiling, in 300 cc. of methanol containing 1% of acetic acid. A boiling solution of 26 g. of reagent B (excess of 10%) in 200 cc. of methanol containing 1% of acetic acid is added thereto and the mixture is heated under reflux on a water bath. The hydrazone B crystallizes thereby. The mixture is allowed to stand over night. The crystalline mass is centrifuged, washed with methanol, thereafter with N hydrochloric acid to eliminate the excess of reagent B, and finally with water and is dried at 120° C. 45.8 g., corresponding to 68.5% of a mixture of hydrazones B melting at about 200–210° C. are obtained.

Said 45.8 g. hydrazones B are taken up with 200 cc. of dichloro ethane. The mixture is kept lukewarm on the water bath for several minutes and is then cooled to room temperature. The insoluble material is removed by filtering and is again taken up with 200 cc. of dichloro ethane. The mixture is treated as described above and the whole procedure is again repeated with 50 cc. of dichloro ethane. On drying, 26 g. of hydrazone B of 3,11,20-triketo-17α-hydroxy-21-acetoxy pregnane melting at 210° C., are obtained, corresponding to about 56.5% of the mixture used as starting material.

The dichloro ethane extracts are combined and distilled to dryness in a vacuum. 18.5 g. corresponding to 40% of hydrazone B of cortisone acetate are obtained in crystalline form on addition of aqueous acetic acid.

On splitting up said two hydrazones B according to the methods described in the preceding examples, on the one hand, cortisone acetate, and, on the other hand, 3,11,20-triketo-17α-hydroxy-21-acetoxy pregnane are regenerated.

In the same manner there may be obtained the benzilic acid hydrazones of

Desoxycortisone acetate: Small plates, M. P. 143° C.;
Nor-cholestenolone: Platelets, M. P. 255° C.;
Androstanolone benzoate: Microcrystals, M. P. 155° C.;
Equiline: M. P. 182° C., soluble in methanol;
Equilenine: M. P. 170° C., soluble in methanol.

Of course, many changes and variations in the reaction conditions, the solvents used, the temperature and duration of the condensation reaction, the methods of isolating, purifying, and working up the hydrazones B, the manner in which said hydrazones B are decomposed and split up to the corresponding ketones and the like may be made by those skilled in the art in accordance with the principles set forth herein and in the claims annexed hereto.

I claim:

1. In a method of purifying and selectively isolating estrone from a mixture containing estrone and equiline and equilenine, the steps comprising dissolving said mixture in methanol containing acetic acid, adding thereto the hydrazide of benzilic acid, boiling said reaction mixture under reflux to condense said hydrazide with the keto steroids present in said mixture, cooling said reaction mixture, separating the selectively precipitated benzilic acid hydrazone of estrone, heating said hydrazone in solution in an organic solvent with hydrochloric acid to split up said hydrazone, cooling the cleavage solution, and separating the pure estrone regenerated thereby.

2. In a process of purifying and isolating estrone from a solution containing a mixture of estrone, equiline, and equilenine, the steps comprising adding benzilic acid hydrazide to said solution, permitting said benzilic acid hydrazide to condense with said estrone, equiline and equilenine, separating the precipitated benzilic acid hydrazone of estrone from the dissolved benzilic acid hydrazones of equiline and equilenine, and splitting up the separated benzilic acid hydrazone of estrone to substantially pure estrone free from equiline and equilenine.

3. In a method of purifying and isolating estrone according to claim 2, wherein the condensation is carried out while heating.

4. In a method of purifying and isolating estrone according to claim 2, wherein the benzilic acid hydrazide is added to a solution of estrone, equiline, and equilenine in an organic solvent of neutral reaction.

5. In a method of purifying and isolating estrone according to claim 4, wherein the condensation is carried out in the presence of an acid agent.

6. In a method of purifying and isolating estrone according to claim 5, wherein the acid agent is acetic acid.

7. The benzilic acid hydrazone of estrone.

8. The benzilic acid hydrazone of equiline.

9. The benzilic acid hydrazone of equilenine.

10. The benzilic acid hydrazones of estrogenic hormones selected from the group consisting of estrone, equiline, and equilenine.

References Cited in the file of this patent

UNITED STATES PATENTS 2,103,735   Schoeller _____ Dec. 28, 1937

OTHER REFERENCES

Curtius: Jour. Prakt. Chem., 2nd series, vol. 95, 196 (1917).